US012585742B1

(12) United States Patent
Kumar et al.

(10) Patent No.: US 12,585,742 B1
(45) Date of Patent: *Mar. 24, 2026

(54) SECURING INTERACTIONS USING USER INTERFACE WINDOWS

(71) Applicant: Citibank, N.A., New York, NY (US)

(72) Inventors: Neeraj Kumar, Savannah Condopark (SG); Katte Ramakantha Acharya, Mandarin Gardens (SG); Bendagiri Matam Shiva Kumar, Livia (SG); Sidda Reddy Narala, Pasir Ris (SG); Sia Jennifer Ng, Pasir Ris (SG); Jenny Zhu Hipolito, Dakota Residences (SG); Hyejin Cho, Alex Residence (SG)

(73) Assignee: Citibank, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/209,773

(22) Filed: May 15, 2025

Related U.S. Application Data

(63) Continuation-in-part of application No. 17/571,978, filed on Jan. 10, 2022.

(51) Int. Cl.
    *G06F 21/31* (2013.01)
    *G06F 9/445* (2018.01)
    (Continued)

(52) U.S. Cl.
    CPC .......... *G06F 21/31* (2013.01); *G06F 9/44526* (2013.01); *G06F 9/452* (2018.02); *G06F 9/545* (2013.01)

(58) Field of Classification Search
    CPC ...... G06F 21/31; G06F 9/44526; G06F 9/452; G06F 9/545
    See application file for complete search history.

(56) References Cited

U.S. PATENT DOCUMENTS

| | | | |
|---|---|---|---|
| 9,760,871 B1 | 9/2017 | Pourfallah et al. | |
| 10,417,706 B1 * | 9/2019 | Simon | G06Q 30/0643 |

(Continued)

FOREIGN PATENT DOCUMENTS

| | | |
|---|---|---|
| JP | 7254961 B2 | 4/2023 |

OTHER PUBLICATIONS

Sobel, L., 2015. Secure Input Overlays: increasing security for sensitive data on Android (Doctoral dissertation, Massachusetts Institute of Technology). (Year: 2015).*

(Continued)

*Primary Examiner* — James R Turchen
(74) *Attorney, Agent, or Firm* — Perkins Coie LLP

(57) ABSTRACT

An authorization flow management system provides multiple authorization options to a user when conducting an authorization event. The system provides options to a user during an authorization event to select a preferred interaction path without integrating the process into a merchant system. The system receives a request from a merchant computing device to authorize an interaction with a user and provides instructions to a user computing device to open a window on a user interface to receive a security code and to display options to select from one of at least two interaction paths, such as paying with rewards points or with an equal payment plan. When the user communicates a response to the opened window that selects one of the interaction paths and the communicated code, the system conducts the interaction utilizing the selected interaction path and communicates an authorization for the interaction to the merchant computing device.

20 Claims, 7 Drawing Sheets

(51) Int. Cl.
  *G06F 9/451*  (2018.01)
  *G06F 9/54*  (2006.01)

(56) References Cited

U.S. PATENT DOCUMENTS

| | | | |
|---|---|---|---|
| 11,978,080 B2 | 5/2024 | Vlas et al. | |
| 2008/0091616 A1 | 4/2008 | Helwin et al. | |
| 2011/0179472 A1* | 7/2011 | Ganesan | H04L 67/02 |
| | | | 726/6 |
| 2011/0265149 A1* | 10/2011 | Ganesan | H04L 9/3215 |
| | | | 726/4 |
| 2013/0218721 A1 | 8/2013 | Borhan et al. | |
| 2014/0046781 A1 | 2/2014 | Walker et al. | |
| 2014/0114777 A1* | 4/2014 | Guyot | G06Q 20/20 |
| | | | 705/16 |
| 2014/0244506 A1 | 8/2014 | Gramling | |
| 2014/0244514 A1* | 8/2014 | Rodriguez | G06Q 20/227 |
| | | | 348/150 |
| 2016/0028715 A1 | 1/2016 | Sivashanmugam et al. | |
| 2016/0203468 A1 | 7/2016 | Chen | |
| 2016/0260085 A1 | 9/2016 | Yen et al. | |
| 2018/0253718 A1 | 9/2018 | Khan et al. | |
| 2018/0285870 A1 | 10/2018 | Ulrich et al. | |
| 2018/0315051 A1* | 11/2018 | Hurley | G06Q 20/326 |
| 2019/0073666 A1 | 3/2019 | Ortiz et al. | |
| 2019/0147515 A1 | 5/2019 | Hurley et al. | |
| 2019/0362414 A1 | 11/2019 | Viegas et al. | |
| 2020/0027114 A1* | 1/2020 | Gandhi | G06Q 50/01 |
| 2020/0184451 A1 | 6/2020 | Hafner et al. | |
| 2021/0065170 A1 | 3/2021 | Shriver et al. | |
| 2021/0383366 A1* | 12/2021 | DePopas | G06Q 20/38215 |
| 2022/0058645 A1 | 2/2022 | Osborn et al. | |
| 2022/0121689 A1 | 4/2022 | James et al. | |
| 2022/0198417 A1 | 6/2022 | Jones et al. | |
| 2022/0398585 A1* | 12/2022 | Anderson | G06Q 20/4014 |
| 2023/0010678 A1* | 1/2023 | Schlesinger | G06Q 20/065 |
| 2023/0072087 A1* | 3/2023 | Dill | G06Q 20/227 |
| 2023/0297992 A1* | 9/2023 | Davis | G06Q 20/367 |
| | | | 705/39 |
| 2024/0394703 A1* | 11/2024 | Gueroult | G06Q 20/381 |
| 2025/0005557 A1* | 1/2025 | Kolchin | G06Q 20/389 |
| 2025/0094980 A1* | 3/2025 | McGaugh | G06Q 20/3821 |

OTHER PUBLICATIONS

Notice of Allowance mailed Jun. 24, 2025, issued in U.S. Appl. No. 17/571,978 (11 pages).

U.S. Appl. No. 17/571,978 entitled, "Authorization Flow Management System", Neeraj Kumar et al., filed Jan. 10, 2022.

* cited by examiner

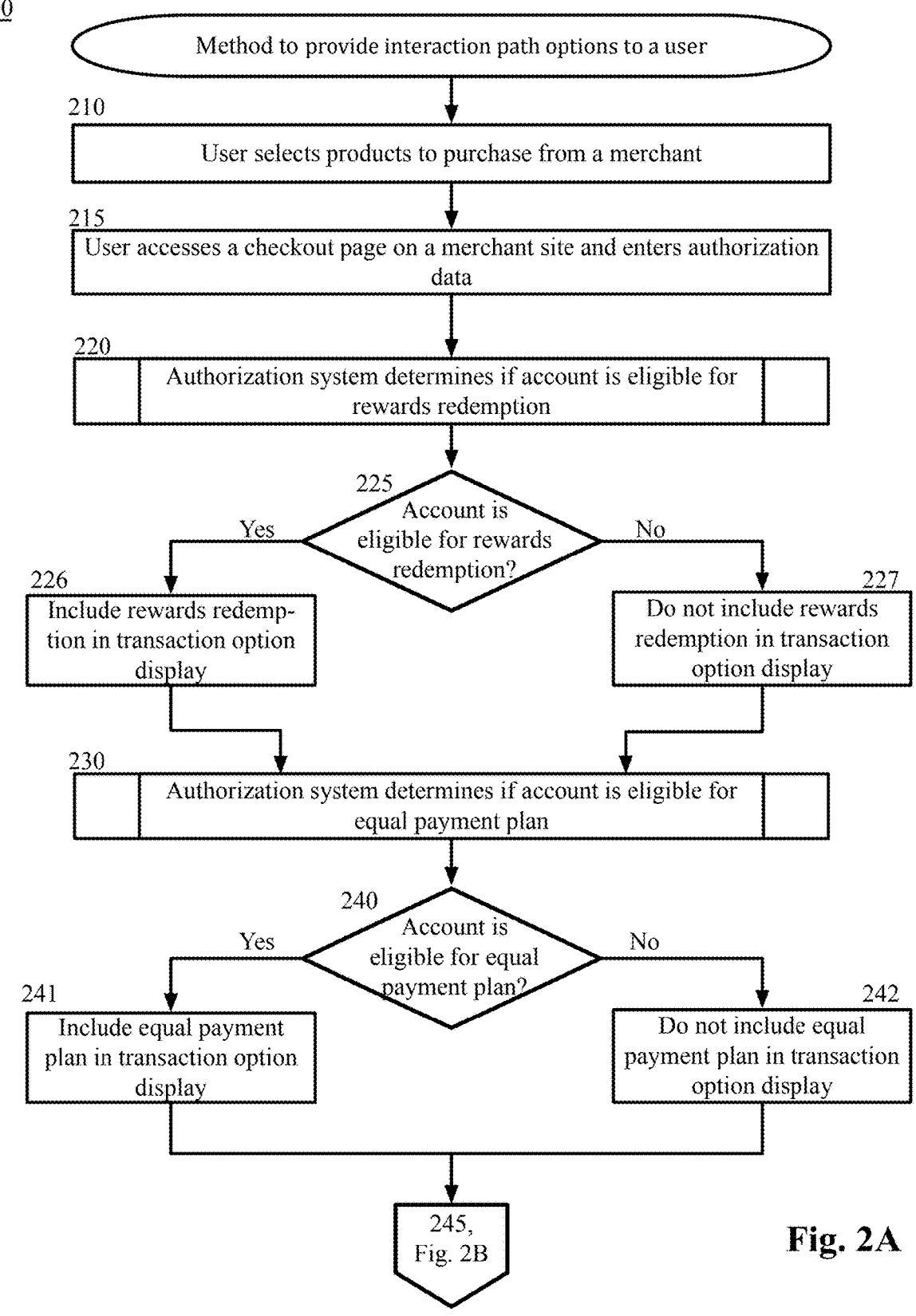

200

Method to provide interaction path options to a user

210

User selects products to purchase from a merchant

215

User accesses a checkout page on a merchant site and enters authorization data

220

Authorization system determines if account is eligible for rewards redemption

225

Account is eligible for rewards redemption?

Yes

No

226

Include rewards redemption in transaction option display

227

Do not include rewards redemption in transaction option display

230

Authorization system determines if account is eligible for equal payment plan

240

Account is eligible for equal payment plan?

Yes

No

241

Include equal payment plan in transaction option display

242

Do not include equal payment plan in transaction option display

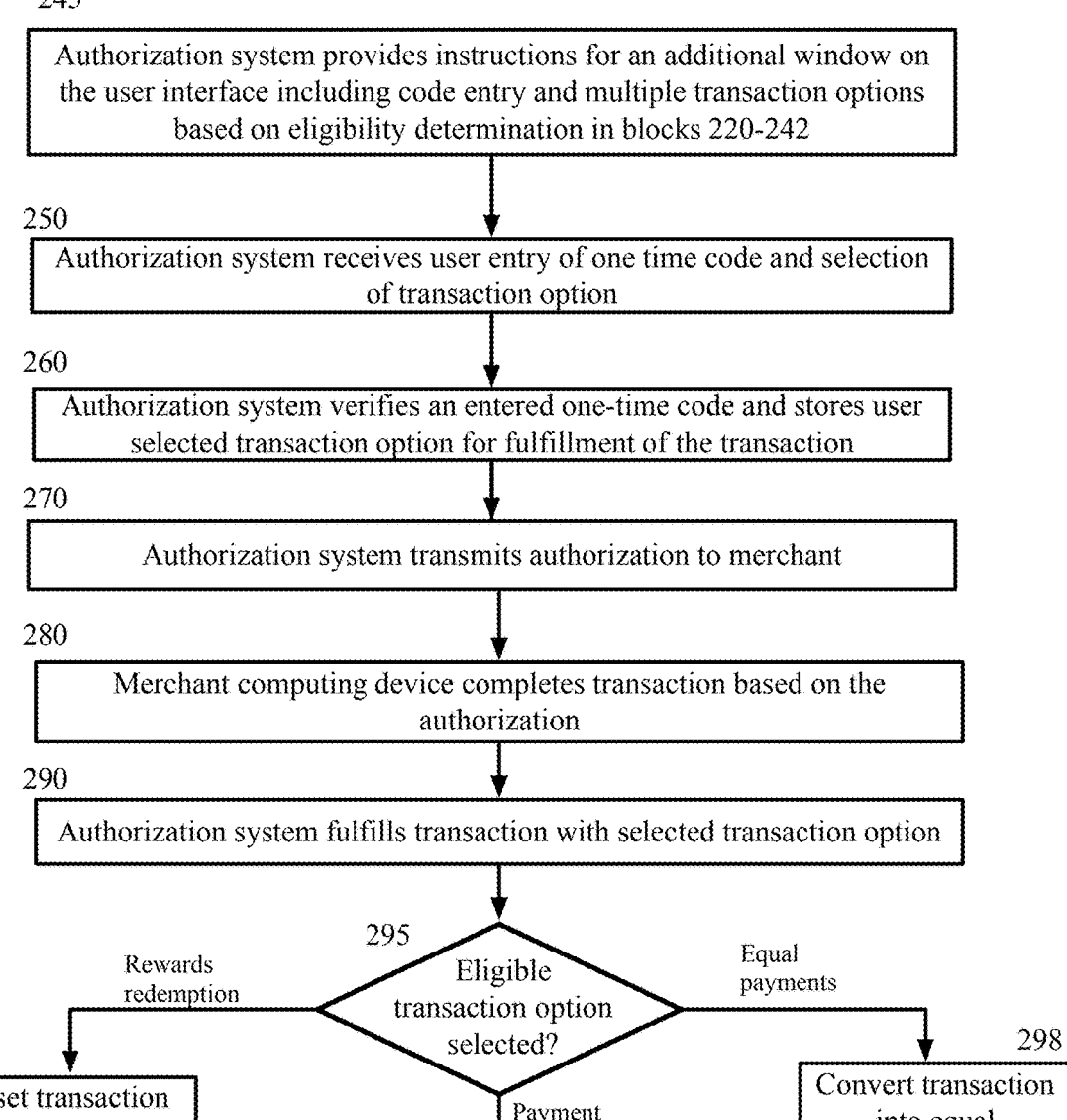

245

Authorization system provides instructions for an additional window on the user interface including code entry and multiple transaction options based on eligibility determination in blocks 220-242

250

Authorization system receives user entry of one time code and selection of transaction option

260

Authorization system verifies an entered one-time code and stores user selected transaction option for fulfillment of the transaction

270

Authorization system transmits authorization to merchant

280

Merchant computing device completes transaction based on the authorization

290

Authorization system fulfills transaction with selected transaction option

295

Eligible transaction option selected?

Rewards redemption

Equal payments

296

Offset transaction by redeeming re-wards points

Payment Instrument

298

Convert transaction into equal payment plan

297

Fulfill transaction with payment instrument

299

Authorization system provides confirmation message to user via email or text message

Fig. 2B

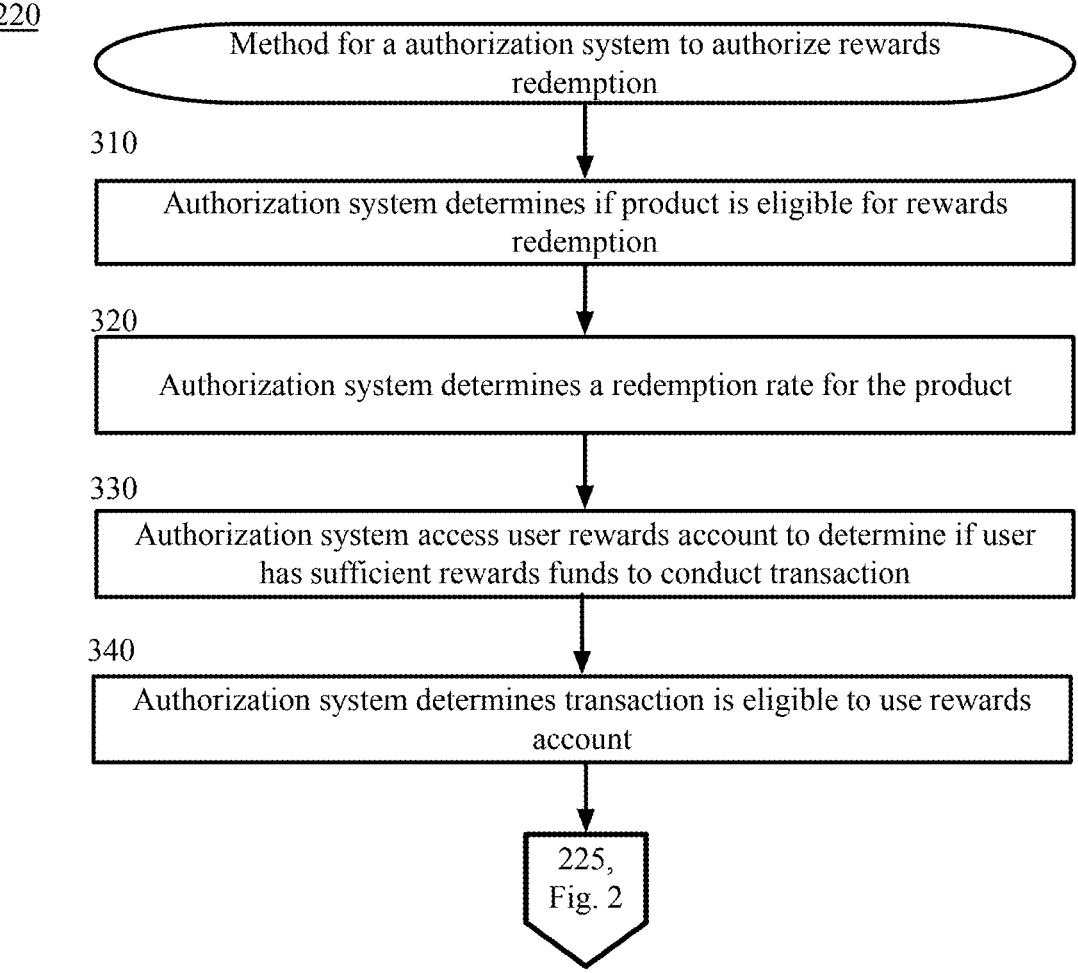

220

Method for a authorization system to authorize rewards redemption

310
Authorization system determines if product is eligible for rewards redemption 320
Authorization system determines a redemption rate for the product 330
Authorization system access user rewards account to determine if user has sufficient rewards funds to conduct transaction 340
Authorization system determines transaction is eligible to use rewards account 225,
Fig. 2

Fig. 3

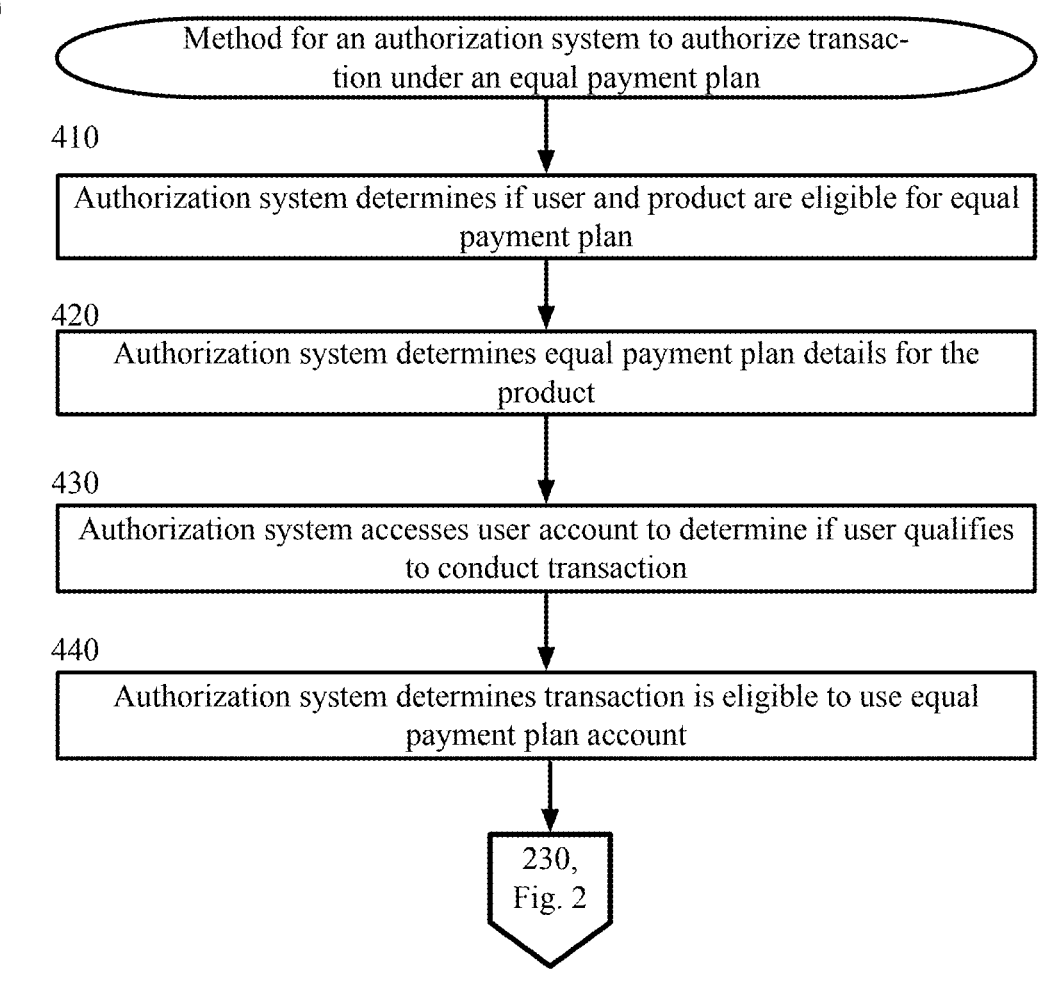

230

Method for an authorization system to authorize transaction under an equal payment plan

410

Authorization system determines if user and product are eligible for equal payment plan

420

Authorization system determines equal payment plan details for the product

430

Authorization system accesses user account to determine if user qualifies to conduct transaction

440

Authorization system determines transaction is eligible to use equal payment plan account 230,
Fig. 2

Fig. 4

SECURING INTERACTIONS USING USER INTERFACE WINDOWS

BACKGROUND

Many computing systems provide users with a single interaction path. However, users are often interested in multiple interaction paths. However, once the system is in place, it may be difficult to implement additional interaction paths. This implementation requires access to the code and new code creation to incorporate the new interaction paths. Implementing the new code is often cumbersome and requires downtime and security upgrades, especially if the new interaction paths are associated with third parties.

SUMMARY

Thus, a mechanism is disclosed herein that resolves the foregoing issues and provides, for example, improved methods and systems to allow a network of machines, services, or other objects to provide options to a user during an authorization event to select a preferred interaction path without requiring integration with the code or generating new computer code. An authorization system may be used to perform the operations described herein. The authorization system may receive, from a first computing device at a second computing device over a first communication channel, a request to secure an interaction with a user. The user may be attempting to perform an interaction and, thus, may need to be authorized by the authorization system to perform the interaction. For example, the interaction may be a data request or a resource request.

The authorization system may then determine, during a time period of the interaction, a plurality of interaction paths available for the user. For example, the data or the resources being requested by the user may be located on different systems; thus, the authorization system may determine different paths to those systems for accessing the data or resources.

The authorization system may then provide the user with options and authenticate the user. In particular, the authorization system may generate one or more instructions to display a user interface on a user computing device to receive a security code and the plurality of interaction paths for the user. For example, the security code may be used to authenticate the user, and the plurality of interaction paths may enable the user to select which system to utilize for data access or select the system for resource usage.

Once the one or more instructions have been generated, they may be transmitted to a special plug-in for execution. In particular, the authorization system may transmit, to a plug-in installed on the first computing device during the time period of the interaction and in a second communication channel that is separate from the first communication channel, the one or more instructions for the plug-in. The plug-in may be instructed and/or configured to open a pop-up window on the user computing device to receive the security code. Furthermore, the pop-up window may overlay a user interface window utilized to conduct the interaction. In addition, the pop-up window may display the plurality of interaction paths. When the pop-up window is displayed on the user computing device, the pop-up window may communicate directly with the second computing device, bypassing the first computing device.

In some embodiments, the authorization system may communicate the security code to the user computing device in a third communication channel separate from the first communication channel and the second communication channel. For example, the authorization system may communicate the security code in a different application, in a text message (e.g., a short message service message), in an electronic email, or using another suitable communication channel.

The authorization system may then receive a communication from the user computing device in response to opening the pop-up window. The communication may include a selection of an interaction path and the security code. For example, the user may enter, into the pop-up window, the received security code and may select one of the provided interaction paths. The user selections may then be received from the user's computing device, bypassing the first computing device. Once the user selection is received and the user is authenticated using the security code, the authorization system may cause the interaction to be conducted using a selected interaction path. For example, the authorization system may cause the data to be received from the system associated with the selected interaction path. In another example, the authorization system may direct the user computing device to use the resources (e.g., processing, memory, etc.) of the system associated with the selected path.

BRIEF DESCRIPTION OF THE DRAWINGS

FIGS. 2A and 2B are block flow diagrams depicting a method to provide interaction path options to a user.

FIG. 3 is a block flow diagram depicting a method for the authorization system to authorize rewards redemption.

FIG. 4 is a block flow diagram depicting a method for an authorization system to authorize transactions under an equal payment plan.

DETAILED DESCRIPTION

Figure 1:
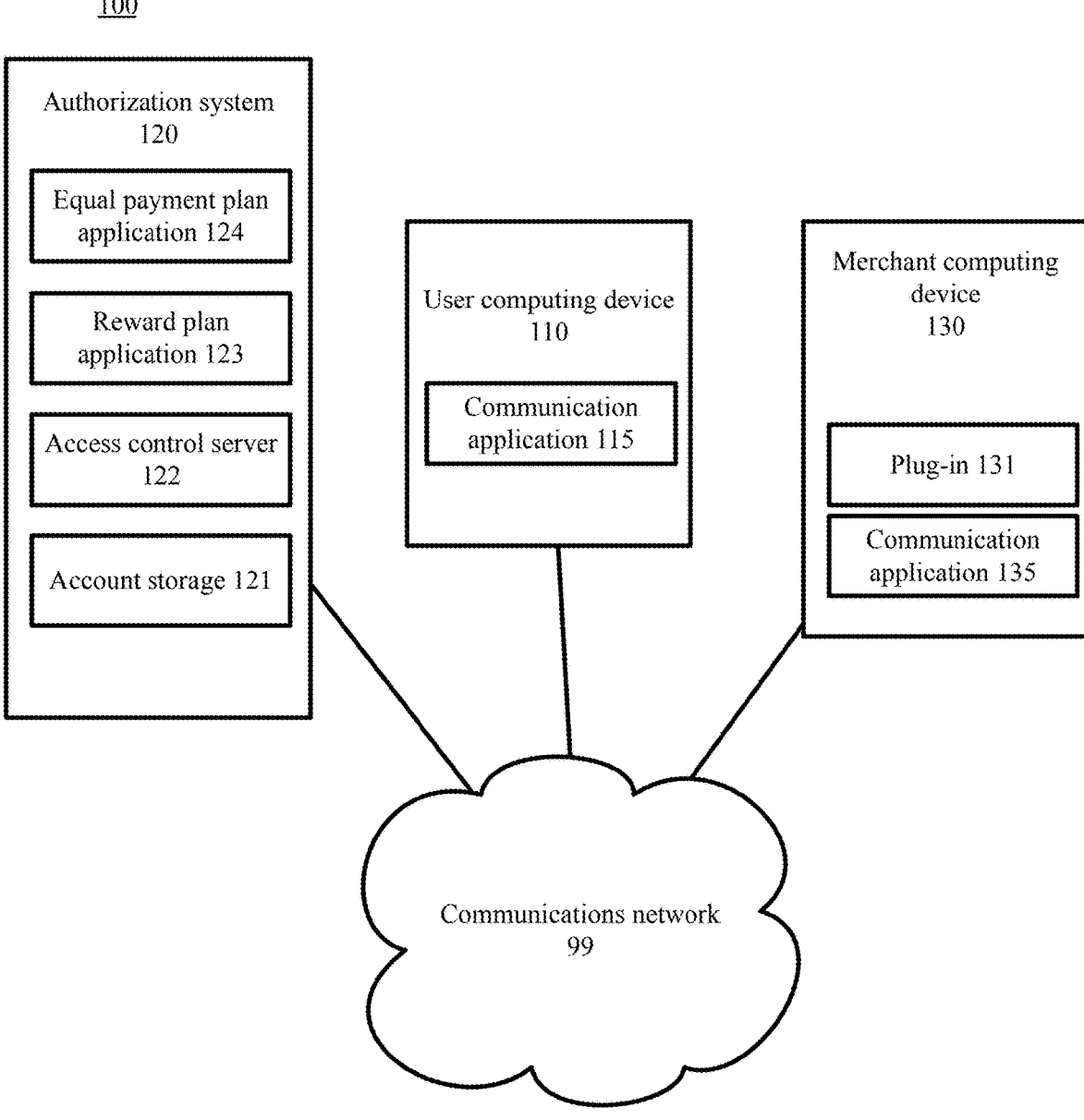
FIG. 1 is a block diagram depicting a system to provide interaction path options to a user.

The present disclosure relates generally to user authorization and, more particularly, to providing multiple execution path options when conducting an authorization event. That is, the authorization system provides options to a user during an authorization event to select a preferred interaction path without integrating the process into third-party systems.

In some embodiments, the authorization system may perform the following operations to authorize a user and present and follow a particular execution path. The authorization system may receive, from a first computing device at a second computing device over a first communication channel, a request to secure an interaction with a user. For example, the user may be requesting access to certain data or may be asking to use resources (e.g., processor, memory, etc.) for a particular application. For example, a user may want to execute certain mathematical or statistical operations on a dataset and may need resources from, for example, a cloud system or another suitable system. Thus, the second computing device (e.g., hosting the authorization system) may receive, from a system with which the user interfaces, the request for the interaction.

The authorization system may also determine a plurality of interaction paths available for the user. For example, the user may be performing authentication or authorization to access particular data or requesting access to particular resources. Thus, the authorization system may determine different interaction paths (e.g., identify different systems) that may be selected by the user. In the example where a user is asking for resources (e.g., to perform operations on a dataset), the authorization system may query different applications associated with the corresponding systems that host the resources to determine which systems have available resources. For example, the user may need a particular quantity of processing power and memory to perform the operations on the user's dataset. Thus, the corresponding systems may return resource availability for each system. In another example, the user may need access to certain data that may be spread to different systems. The authorization system may contact each system to determine whether the data is available and the system can handle the request for that data. Each system may use a corresponding application to respond with availability. In some embodiments, this operation may be performed during the pendency of the interaction. That is, this determination may be performed on the fly so that the results may be presented to the user.

In some embodiments, the authorization system may use information with an account associated with the user to determine availability of interaction paths. Thus, the authorization system may use the following operations to determine the plurality of interaction paths available for the user. The authorization system may access an account associated with the user to retrieve a plurality of user parameters. For example, the user may have an associated account storing user parameters. Some of those parameters may be permissions to use certain computing systems (e.g., different cloud services). The user may be allowed to use certain systems for data access and/or resource usage but not others. Thus, the authorization system may determine whether the plurality of interaction paths is available to the user based on the plurality of user parameters retrieved from the account associated with the user. That is, the authorization system may use the parameters within the user account (e.g., permission entries) to determine which interaction paths are available to the user.

As discussed within this disclosure, the authorization system may use preconfigured applications to determine which interaction paths are available to the user. In particular, the authorization system may identify a plurality of applications corresponding to the plurality of interaction paths. For example, each computing system (e.g., cloud system) may include an application that provides resource availability or data availability for providing an interaction path for the user via that system. Thus, the authorization system may have access to execute those applications.

The authorization system may then input, into the plurality of applications, a user identifier associated with the user. Each application may receive a user identifier and determine whether the user corresponding to the user identifier has permissions to use the system (i.e., the interaction path). In some embodiments, each application may also determine if there are enough resources for the user to perform the interaction. The authorization system may then receive, from the plurality of applications, a corresponding indication indicating whether a corresponding interaction path is available to the user. That is, each application may determine, for example, based on the user having permissions to use the system and/or ability to execute the interaction based on the amount of available resources, whether a corresponding interaction path is available to the user. The authorization system may then determine that the plurality of interaction paths is available to the user based on each corresponding indication.

Thus, the authorization system may present to the user only interaction paths corresponding to the systems that returned positive results.

When the interaction paths have been determined, the authorization system may prepare a display for a user to authenticate and select an interaction path. In particular, the authorization system may generate one or more instructions to display (1) a user interface on a user computing device to receive a security code and (2) the plurality of interaction paths for the user. For example, the authorization system may generate a code to send to the user in a different communication channel. That code may be sent via email, text message, through a special application, or via another suitable mechanism. The instructions may include a prompt to enter the code together with a prompt to select an interaction path. The instructions may be formatted in a format supported by the user computing device (e.g., a web browser or another suitable application on the user computing device). For example, a user may have a file that stores the data on which the user wishes to perform operations. The user may access an interface (e.g., a web page) using a web browser or another application that enables the user to upload the data for performing operations. Thus, the instructions may be sent to the user's computing device separately from the web page or application.

Once the instructions have been generated, they may be transmitted to the user via the first computing device. In particular, the authorization system may transmit, to a plug-in installed on the first computing device in a second communication channel that is separate from the first communication channel, the one or more instructions for the plug-in to open a pop-up window on the user computing device to receive the security code. In some embodiments, the pop-up window may display the plurality of interaction paths, such that the pop-up window on the user computing device may communicate directly with the second computing device, bypassing the first computing device. For example, the plug-in may be installed on the first computing device. When the plug-in receives the instructions, the plug-in may open a pop-up window on the user computing device (e.g., through a web browser or another suitable application). The pop-up window may include an address of the second computing device such that when the user selects one of the interaction paths and enters the security code, the data may be sent directly to the second computing device configured to process that information. Thus, when the user makes a selection and inputs the security code, that information will be sent directly to the second computing device, bypassing the first computing device.

In some embodiments, the pop-up window may overlay a user interface window utilized to conduct the interaction. For example, the user may be using a web browser on the user's computing device. Thus, the pop-up window may overlay at least a portion of the web browser window. Furthermore, as discussed above, the pop-up window may display the plurality of interaction paths. The interaction paths may be selectable so that a user may select a single interaction path. For example, each interaction path may correspond to a computing system for executing data access (e.g., data retrieval) or data processing (e.g., resource access). As discussed above, the pop-up window may also include an entry field for entering the security code sent to the user.

In addition, the authorization system may transmit a security code to the user. In particular, the authorization system may communicate the security code to the user computing device in a third communication channel separate from the first communication channel and the second communication channel. For example, the authorization system may transmit the security code in an email, a text message (e.g., a short message service message), or via another suitable independent communication channel.

The authorization system may then wait for a response from the user before proceeding with further operations. The authorization system may then receive a communication from the user computing device in response to opening the pop-up window. The communication may include a selection of an interaction path and the security code. The authorization system may, upon receipt, then compare the received security code and the generated security code. If the security codes match, the authorization system may continue processing. If the security codes do not match, the authorization system may stop further operations and inform the user that the security code is incorrect.

The authorization system may then cause the interaction to be conducted using a selected interaction path. For example, the authorization system may transmit a command to the computing system associated with the selected interaction path to serve the data requested by the user. In some embodiments, the authorization system may transmit a path to the user device (e.g., via the plug-in) to access the data being requested by the user. In another example, the authorization system may transmit to the user computing device instructions on how to execute data processing operations (e.g., use the resources) requested by the user on a computing system (e.g., a cloud system) that was selected.

When the interaction has been completed or has been initiated, the authorization system may inform the user. In particular, the communication system may communicate a confirmation message to the user computing device that the interaction was conducted with the selected interaction path. For example, the authorization system may use the plug-in to communicate the message to the user computing device. The message may be communicated in a pop-up window or in a different way.

In some embodiments, before using the plug-in, the authorization system may cause the plug-in to be installed. In particular, the authorization system may, in response to the request, transmit the plug-in to the first computing device with a command to install and activate the plug-in. The plug-in may include an address associated with the second computing device. For example, the authorization system may configure the plug-in to use the address to communicate with the authorization system during operation. The configuration may be applied to the plug-in on the target system when the plug-in is received. In some embodiments, during operation, the authorization system may transmit to the plug-in an address associated with the second computing device. Furthermore, the pop-up window may communicate directly with the second computing device, as discussed above.

OTHER EMBODIMENTS

Businesses often provide users with rewards programs, installment payment programs, and other customer benefits. These programs help ensure customer loyalty, ease the payment process, and increase customer interaction. However, these programs may be difficult to implement. For example, a payment instrument may implement options on a merchant website. This implementation requires the authorization system to access the code of the merchant website and jointly create new code to incorporate the process on the merchant website. Implementing the code on merchant websites is often cumbersome, burdensome, insecure, and costly.

In another example, an authorization system recognizes the transaction of a user after the transaction has occurred. The authorization system then attempts to entice the customer after the transaction to utilize one or more incentive programs, such as by paying for the transaction with rewards points. This process is often not effective because customers are being solicited at a later time and the customer must initiate a new interaction with the authorization system to enjoy any of the options offered.

There is a present need for a solution that resolves all of the foregoing issues and provides, for example, improved methods and systems to allow a network of machines, services, or other objects to provide options to a user during an authorization event to select a preferred transaction path option during the transaction that does not require integration into the merchant's system.

Embodiments of the invention employ computer hardware and software, including, without limitation, one or more processors coupled to memory and non-transitory, computer-readable storage media with one or more executable programs stored thereon that instruct the processors to perform the methods and processes described herein. Such embodiments are directed to technological solutions that may involve systems that include, for example, at least one processor coupled to memory and programmed to provide options to a user during an authorization event to select a preferred interaction path without integrating the process into a merchant system.

In an example, an authorization flow management system provides multiple authorization options to a user when conducting an authorization event. The system provides options to a user during an authorization event to select a preferred interaction path without integrating the process into a merchant system. The system receives a request from a merchant computing device to authorize an interaction with a user and provides instructions to a user computing device to open a window on a user interface to receive a security code and to display options to select from a plurality of interaction paths, such as paying with rewards points or with an equal payment plan. When the user communicates a response to the opened window by selecting one of the plurality of interaction paths and the communicated code, the system conducts the interaction utilizing the selected interaction path and communicates an authorization for the interaction to the merchant computing device.

In certain examples, the system communicates a confirmation message to the user computing device that the interaction was conducted with the selected interaction path after processing the selection. In an example, the interaction is a purchase transaction, and the system determines if the selected interaction path is eligible based on an analysis of an account of the user and the product or service in the transaction.

In certain examples, the user interface on the user computing device displays a website managed by the merchant computing device. The opened window may be a pop-up window or other type of window that opens on the user computing device and may be displayed over a checkout page of the merchant website. In an example, the opened window is configured by a plug-in on the merchant computing device. The system allows the window to be utilized without collaborating with the software managing the merchant website or application.

In certain examples, the authentication code is communicated to the user computing device via a push notification, an email, or a text message. The code may be a one-time code, a password, or any other suitable two-factor authentication code or any other suitable code. The code is communicated in a separate channel from the interaction communications.

In certain examples, at least one of the interaction path options presented to the user is an option to pay for the interaction with rewards points. In another example, at least one of the interaction paths is an option to pay for the interaction in an equal payment plan. In another example, at least one of the interaction paths is an option to pay for the interaction with a payment instrument. In one example, the payment instrument is a credit card or a debit card.

In an example, the system debits a rewards account of the user to purchase the product in response to a selection of an interaction path to pay with rewards points. In another example, a purchase of the product is divided into a plurality of equal payments in response to a selection of an equal payment plan for the interaction path.

The system provides the options to use alternate transaction paths to provide a quicker, seamless customer experience. By allowing a user to redeem rewards points, pay with equal payments, split a transaction, or select any other path, the system reduces bandwidth and computer processing by removing the need for a user to perform these selections in an alternate channel or at an alternate time. For example, a user doesn't have to access a rewards points website, determine a number of points available, determine if a product qualifies for a rewards purchase, and then find a method of redeeming the points. The user merely clicks the option to pay with points, and the system manages the process seamlessly with less processing and transmission time. Further, because the authorization system performs the methods described herein without integrating with the merchant software or hardware, all of the computer systems involved operate more efficiently. The authorization system is not required to interrupt the operations of the merchant computing device to provide the options to the user. The authorization system is not required to collaborate with merchant computing device operators to integrate the computing software. Better outcomes are obtained for the merchant, the user, and the authorization system because users are provided a process to make easier transactions with less time and effort.

These and other aspects of the invention will be set forth in part in the description that follows and in part will become more apparent to those skilled in the art upon examination of the following or may be learned from practice of the invention. All such aspects are to be included within this description, are to be within the scope of the present invention, and are to be protected by the accompanying claims.

Example System Architecture

FIG. 1 is a block diagram depicting a system to provide interaction path options to a user. As depicted in FIG. 1, the architecture 100 includes an authorization system 120, a user computing device 110, and a merchant computing device 130 connected by communications network 99.

Each network, such as communication network 99, includes a wired or wireless telecommunication mechanism and/or protocol by which the components depicted in FIG. 1 can exchange data. For example, each network 99 can include a local area network ("LAN"), a wide area network ("WAN"), an intranet, an Internet, a mobile telephone network, storage area network (SAN), personal area network (PAN), a metropolitan area network (MAN), a wireless local area network (WLAN), a virtual private network (VPN), a cellular or other mobile communication network, Bluetooth, NFC, Wi-Fi, or any combination thereof or any other appropriate architecture or system that facilitates the communication of signals or data. Throughout the discussion of example embodiments, it should be understood that the terms "data" and "information" are used interchangeably herein to refer to text, images, audio, video, or any other form of information that can exist in a computer-based environment. The communication technology utilized by the components depicted in FIG. 1 may be similar to network technology used by network 99 or an alternative communication technology.

Each component depicted in FIG. 1 includes a computing device having a communication application capable of transmitting and receiving data over the network 99 or a similar network. For example, each can include a server, desktop computer, laptop computer, tablet computer, a television with one or more processors embedded therein and/or coupled thereto, smartphone, handheld or wearable computer, personal digital assistant ("PDA"), other wearable device such as a smart watch or glasses, wireless system access point, or any other processor-driven device.

In the example embodiment depicted in FIG. 1, the user computing device 110 is operated by an end-user that is communicating with a merchant computing device 130 to conduct a transaction or other procedure requiring an authorization. The merchant computing device 130 is operated by a merchant, clerk, or other operator of the merchant. The authorization system 120 is operated by an authorization system operator or other user. While each server, system, and device shown in the architecture is represented by one instance of the server, system, or device, multiple instances of each can be used.

As shown in FIG. 1, the user computing device 110 includes a data storage unit (not shown) accessible by a communication application 115. The communication application 115 on the user computing device 110 may be, for example, a web browser application or a stand-alone application to view, download, upload, or otherwise access documents, user interfaces, or web pages via the networks 99. The communication application 115 can interact with web servers or other computing devices connected to the network 99, such as by conducting and authorizing a transaction with the merchant computing device 130 and the authorization system 120.

As shown in FIG. 1, the merchant computing device 130 includes a data storage unit (not shown) accessible by a communication application 135. The communication application 135 on the merchant computing device 130 may be, for example, a web browser application or a stand-alone application to view, download, upload, or otherwise access documents or web pages via the networks 99. The communication application 135 interacts with web servers or other computing devices connected to the network 99, such as by conducting and authorizing a transaction with the user computing device 110 and the authorization system 120. The plug-in 131 may be any hardware or software that operates on the merchant computing device 130 to allow a user to interface with the authorization system 120 while on the merchant computing device 130. For example, the plug-in 131 may be a pop-up window or other interface that is displayed on the user interface of the merchant web page. The plug-in may be communicated in real time to the merchant computing device 130 when needed to display the window over a web page or other user interface managed by the merchant computing device 130.

As shown in FIG. 1, the authorization system 120 includes an access control server 122, an account storage 121, a reward plan application 123, and an equal payment plan application 124. Each of these functions or devices may be encoded in hardware or software, may be functions of a device of the authorization system 120 such as a server, may be in a cloud-based computing environment, may be separate devices connected to other devices of the authorization system 120, or may be functions or algorithms operating on other devices of the authorization system 120.

The access control server 122 receives authorization requests from merchant computing devices 130, interacts with user computing devices to manage user access, provides authorization messages to merchant computing devices 130, and performs any other suitable functions to allow the authorization system 120 to authorize user transactions with merchants. The account storage 121 stores user data for use in conducting transactions, providing authorizations, maintaining user account balances, or performing any other suitable actions.

The reward plan application 123 manages a rewards account of the user. For example, the reward plan application 123 stores a username and account number, a number of rewards points accumulated, a number of rewards points spent, a number of rewards points available, and other user data. The reward plan application 123 may store conditions for when rewards points may be used, for what items the rewards points may be redeemed, and other redemption conditions and rules. The reward plan application 123 may operate on a separate server, an application operating on another server of the authorization system 120, an application operating on a third-party server, or configured in any other suitable manner.

The equal payment plan application 124 manages an equal payment account, or installment account, of the user. For example, the equal payment plan application 124 creates and implements a plan to break a transaction charge into equal payments by the user. For example, the equal payment plan may break a $1200 charge for a purchase into twelve $100 charges that are billed to the user once a month for a year. In other examples, a charge may be broken into 2, 6, 10, 20, or 48 equal payments or any other suitable number of payments. The equal payments may be billed or charged on any suitable schedule, such as once a week, once a month, or yearly. The equal payment plan application 124 may store conditions for when the equal payment plan may be used, for what items the equal payment plan may be redeemed, and other equal payment plan conditions and rules. The equal payment plan application 124 may operate on a separate server, an application operating on another server of the authorization system 120, an application operating on a third-party server, or configured in any other suitable manner.

Figure 6:
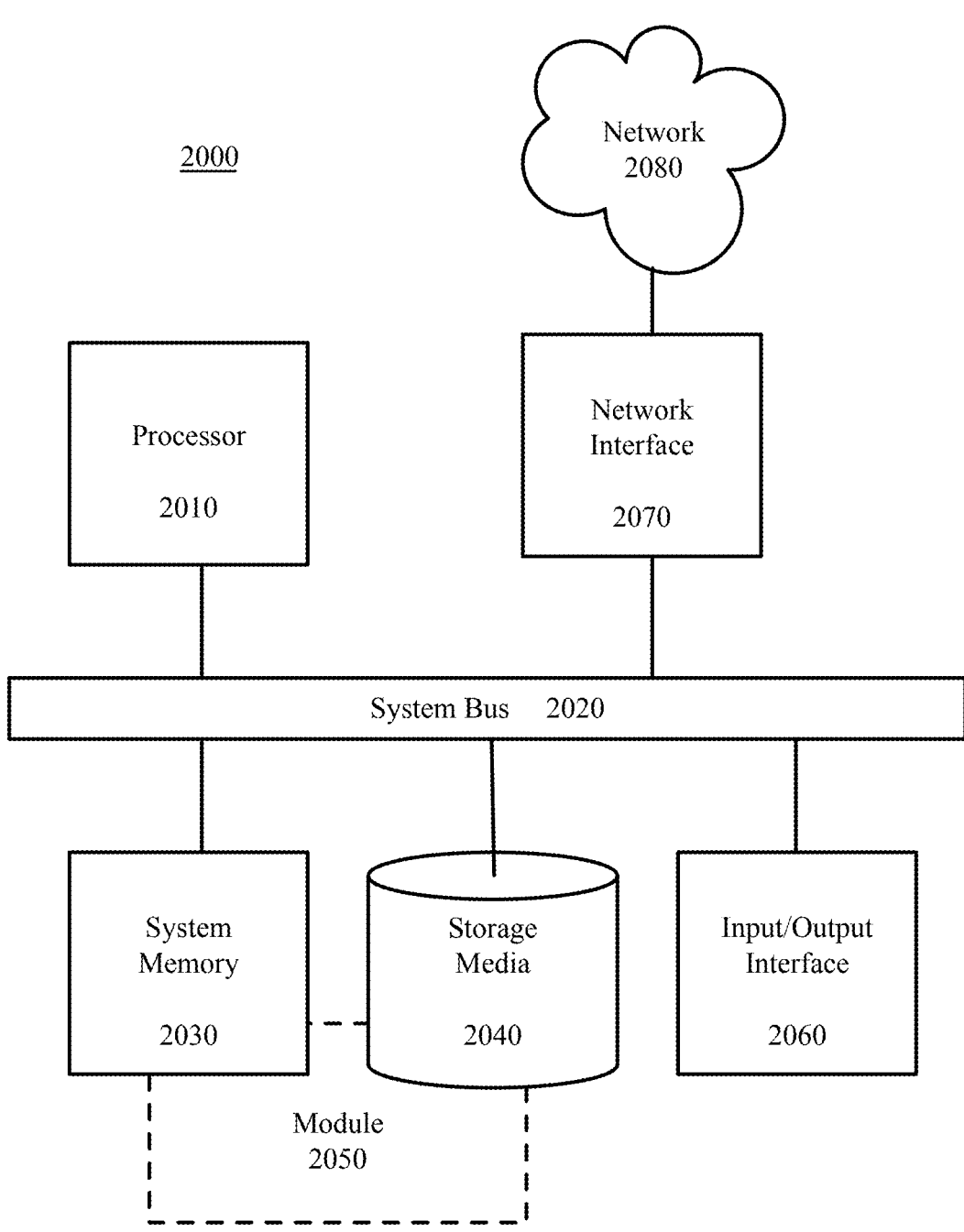
FIG. 6 depicts a computing machine and a module.

In example embodiments, the network computing devices and any other computing machines associated with the technology presented herein may be any type of computing machine such as, but not limited to, those discussed in more detail with respect to FIG. 6. Furthermore, any functions, applications, or components associated with any of these computing machines, such as those described herein or any others (for example, scripts, web content, software, firmware, hardware, or modules) associated with the technology presented herein may by any of the components discussed in more detail with respect to FIG. 6. The computing machines discussed herein may communicate with one another, as well as with other computing machines or communication systems over one or more networks, such as network 99. The network 99 may include any type of data or communications network, including any of the network technology discussed with respect to FIG. 6.

Example Embodiments

Reference will now be made in detail to embodiments of the invention, one or more examples of which are illustrated in the accompanying drawings. Each example is provided by way of explanation of the invention, not as a limitation of the invention. Those skilled in the art will recognize that various modifications and variations can be made in the present invention without departing from the scope or spirit of the invention. For example, features illustrated or described as part of one embodiment can be used in another embodiment to yield a still further embodiment. Thus, the present invention covers such modifications and variations that come within the scope of the invention.

The technology for embodiments of the invention may employ methods and systems to allow a network of machines, services, or other objects to correlate simulated and actual customer journeys to expected outcomes from changes in inputs and drivers. The examples for embodiments of the invention may employ computer hardware and software, including, without limitation, one or more processors coupled to memory and non-transitory, computer-readable storage media with one or more executable computer application programs stored thereon, which instruct the processors to perform such methods.

The example methods illustrated in FIGS. 2-5 are described hereinafter with respect to the components of the example communications and processing architecture 100.

FIGS. 2A and 2B are block diagrams depicting method 200 to provide interaction path options to a user.

Beginning in FIG. 2A, in block 210, a user selects products to purchase from a merchant. A user may represent a customer, a group, a business, or other entity that is interacting with a merchant. The merchant may be an institution, a business, a store, a service provider, or any other entity that is interacting with the user. For example, the interaction may be a purchase transaction, such as when the user is a customer buying a product from a store. In another example, the user may be a representative of a business contracting a service with a service provider. In another example, the interaction may be an entry interaction, such as when the user is accessing an entry into an institution. In another example, the interaction may be a security interaction, such as when the user is accessing a data transfer from an institution. Any other type of interaction between the user and the merchant that employs an authorization process may be represented by the method herein.

In a continuing example throughout the method 200, a user accesses a website of a merchant and selects a product to purchase. The website may be managed or operated by the merchant computing device 130. The user accesses the website from the user computing device 110 via the network 99 over the Internet or via an application operating on the user computing device 110. The user selects a product and places the product in the virtual shopping cart of the website. The user interface provided by the website is displayed on the user computing device 110 via communications using the communication application 115. The user inputs selections and data into the user interface to interact with the website.

In block 215, the user accesses a checkout page on the merchant website and enters authorization data. The user actuates an interface object or other input to navigate the user interface of the website to a checkout page. The checkout page is a page on the merchant website that allows a user to complete a transaction by entering payment information, such as an identification of a payment instrument. The checkout page may allow a user to enter a username, ID, or payment information, review transaction parameters, enter delivery information, or perform any other suitable tasks.

When a user enters data related to a payment instrument or other account data related to the authorization system 120, the merchant computing device 130 communicates a notice to the authorization system 120. The communication may be via an Internet connection over the network 99, a wireless communication, or any other suitable communication technology. The merchant computing device 130 communicates to the authorization system 120 the entered data and any other suitable transaction data, such as a merchant ID, product information, payment terms, or any other suitable data.

In block 220, the authorization system 120 determines if the account is eligible for rewards redemption for the transaction. The details of block 220 are described in further detail in the method 220 of FIG. 3.

FIG. 3 is a block flow diagram depicting a method 220 for the authorization system to authorize rewards redemption.

In block 310, the authorization system 120 determines if the product is eligible for rewards redemption. The authorization system 120 stores data related to the rewards program on the reward plan application 123 operating on one or more devices of the authorization system 120. The stored data may include rules of the rewards plan, products that qualify, special offers for users, user reward account identifications, reward redemption rates, user rewards points balance, and other suitable data for implementing the rewards program. The data and/or the reward plan application 123 may be stored on a database, a server, a third-party server, a cloud-based server, or in any suitable location.

The authorization system 120 accesses the database and determines if the product in the transaction is eligible for the rewards program. Only certain products from a particular merchant may be eligible. For example, at a particular merchant only products related to hotels are eligible for rewards programs, but not products related to airline flights. In another example, for a particular merchant, only physical products are eligible for rewards programs, but not services. The authorization system 120 determines, based on data stored in the database, if the product in the transaction is eligible for a purchase with rewards points and/or if the user is eligible for a purchase with rewards points.

In block 320, the authorization system 120 determines a redemption rate for the product. The database stores information related to a number of rewards points required to purchase a particular product. In an example, the rewards points may be redeemable for any product from a particular merchant at 10 points per dollar of product cost. That is, for a purchase of $100 at the merchant, 1000 rewards points are required for the purchase. In another example, a list of products at the merchant may be stored in the database along with the number of points required to purchase each product.

Additionally, the authorization system 120 determines if any offers are associated with a user or product. In addition to being eligible for being purchased in the rewards program, certain products may have other offers. For example, certain products may be eligible for a program that provides a discount on the number of rewards points used for purchase.

In block 330, the authorization system 120 accesses the user rewards account to determine if the user has sufficient rewards funds to conduct the transaction. The user account data stored in the database stores the number of points the user has accumulated. The authorization system 120 determines if the number of points is equal to or greater than the cost of the product in the transaction. For example, if the product costs 1000 rewards points, the user may only use rewards points if the user has at least 1000 rewards points.

In block 340, the authorization system 120 determines that the transaction is eligible for using the rewards account. If the user has enough points and the product is eligible for rewards points purchases, then the authorization system 120 determines that the transaction may be completed as requested with rewards points. The eligibility is stored on the authorization system 120 for presentation to the user as a transaction option when the pop-up window is presented.

From block 340, the method 220 returns to block 225 of method 200.

In block 225, the authorization system 120 accesses, based on the method 220, the determination of whether the account is eligible for rewards redemption for the transaction. If the authorization system 120 determined that the account is eligible, then the method 200 follows the "Yes" branch to block 226. In block 226, the authorization system 120 includes the rewards redemption option in transaction options displayed to the user.

If the authorization system 120 determined that the account is not eligible, then the method 200 follows the "No" branch to block 227. In block 227, the authorization system 120 does not include the rewards redemption option in transaction options displayed to the user.

From either block 226 or block 227, in block 230, the authorization system 120 determines if the account is eligible for an equal payment plan for the transaction. The details of block 230 are described in further detail in the method 230 of FIG. 4.

FIG. 4 is a block flow diagram depicting a method 230 for the authorization system 120 to authorize a transaction under an equal payment plan.

In block 410, the authorization system 120 determines if the user and the product are eligible for the equal payment plan. The authorization system 120 stores data related to the equal payment plan on the equal payment plan application 124 operating on one or more devices of the authorization system 120. The stored data may include rules of the equal payment plan, products that qualify, special offers for users, user equal payment plan account identifications, equal payment plan interest rates, down payment requirements, user equal payment plan account balances, late payment charges, and other suitable data for implementing the equal pay program. The data may be stored on a database, a server, a third-party server, a cloud-based server, or in any suitable location.

The authorization system 120 accesses the database and determines if the product in the transaction is eligible for the equal payment plan program. Only certain products from a particular merchant may be eligible. For example, only transactions greater than a certain amount, such as $100, or lower than a certain amount, such as $10,000, may be eligible. In another example, only physical products may be eligible for an equal payment plan, and not services or travel. Any other suitable rules may be considered to approve the equal payment plan. The authorization system 120 determines, based on data stored in the database, if the product in the transaction is eligible for an equal payment plan and/or if the user is eligible for an equal payment plan. In certain examples, the payments in a plan are not required to be equal payments. For example, certain plans may have escalating or deescalating payments, such as payments that go up by $10 each month. Other plans may require a down payment, such as 20% of the purchase price, at the time of the transaction. Any other suitable payment plan may be represented by the equal payment plans described herein.

In block 420, the authorization system 120 determines equal payment plan details for the product. The database stores information about how an equal payment plan purchase applies to a particular product. In an example, the equal payment plan for any product from a particular merchant may be configurable for different set amounts of time or number of payments. For example, the equal payment plan may be configured into 6, 10, 12, 18, 20, 48, or any other suitable number of equal payments. The amount of interest charged may be variable and accessed from the database by the authorization system 120. Any other suitable factors may be configured, selected from the database, input by an operator, or otherwise determined.

In block 430, the authorization system 120 accesses the user account to determine if the user qualifies to conduct the transaction. In an example, only users that do not have any current equal payment plans may be eligible to start a new equal payment plan. If a user has a poor credit history in the account, then the authorization system 120 may determine that an equal payment plan should not be authorized. Any other determination may be made by the authorization system 120 when analyzing the user account.

In block 440, the authorization system 120 determines that the transaction is eligible for using the equal payment plan. If the user has sufficiently good credit or, for any other reason, qualifies for the equal payment plan, then the authorization system 120 determines that the transaction may be completed as requested with equal payments. The eligibility is stored on the authorization system 120 for presentation to the user as a transaction option when the pop-up window is presented.

From block 440, the method 230 returns to block 240 of method 200.

In block 240, the authorization system 120 accesses, based on the method 230, the determination of whether the account is eligible for an equal payment plan for the transaction. If the authorization system 120 determined that the account is eligible, then the method 200 follows the "Yes" branch to block 241. In block 241, the authorization system 120 includes the equal payment plan option in transaction options displayed to the user.

If the authorization system 120 determined that the account is not eligible, then the method 200 follows the "No" branch to block 242. In block 242, the authorization system 120 does not include the equal payment plan option in transaction options displayed to the user.

From either block 241 or block 242 the method 200 proceeds to block 245 of FIG. 2B.

In block 245, the authorization system 120 provides instructions for an additional window on the user interface including code entry and multiple transaction options based on eligibility determination in blocks 220-242. The authorization system 120 accesses the user account that is associated with the data from the merchant computing device 130. For example, the user may have entered data associated with an account ID, a username, a payment instrument number, or any other suitable data. The authorization system 120 accesses the user account data from data stored in the account storage 121.

The authorization system 120 determines if the account is enrolled in a secure access program managed by the access control server 122 of the authorization system 120. Accounts that are in the secure access program may have additional passwords or other security measures to ensure that the user is authenticated and authorized to conduct transactions. In the present technology, users in the secure access program utilize a plug-in or other technology to open a window on the merchant website to ensure authentication. In an example, the authorization system 120 provides instructions to the user computing device 110 to open a pop-up window overlaying the merchant website. In another example, the checkout page on the merchant website may initiate and operate a plug-in 131 or other software or hardware function that allows the authorization system 120 to open a pop-up window overlaying the merchant website. The pop-up window or other user interface function allows the user to input information. The plug-in may represent any other type of user interface function, such as a push notification, an additional user interface window, or other type of interface element. The plug-in may operate on the merchant computing device 130, operate solely on the user computing device 110, operate solely on the authorization system 120, or jointly between any of the devices. In an example, the plug-in may operate in conjunction with the merchant computing device 130 by appearing on the web page of the merchant without actually being incorporated in the software or hardware of the merchant computing device 130. For example, the authorization system 120 may direct the user computing device to display a pop-up window over the display of the merchant web page without interacting with the merchant computing device 130.

To provide the plug-in data, the authorization system 120 determines if the account is enrolled in a secure access program and identifies plug-in data to provide to the plug-in on the user interface. The authorization system 120 determines an additional password or two-factor authentication process that is configured for the user account. In an example of two-factor authentication, the authorization system 120 sends to the user a text message, email, or push notification with a one-time code. The one-time code may be sent via a different technology or channel from the technology used in the pending transaction. For example, if the user is utilizing an Internet connection to interact with a merchant web page, then the one-time code may be sent via a text. If the user is utilizing an application to conduct the transaction with the merchant, then the one-time code may be sent via a push notification or other technology separate from the channel or connection used to communicate with the merchant. Using a separate channel prevents a hacking event from accessing both authentication factors. For example, a hacking event of the web browser of a user would thus not access the data from a push notification or a text message.

The plug-in data includes the instructions to the user for accessing the one-time code and a location to enter the one-time code in the plug-in display. Any other type of plug-in data may be provided, including plug-ins for any other type of two-factor authentication or other authentication procedures. If the user's entered one-time code matches the stored one-time code from the authorization system 120 and sent to the user in a separate channel, then the user is authenticated on the user computing device 110.

Additionally, included in the plug-in data from the authorization system 120 are options for completing the transaction with alternative transaction flows. In an example, the options may include paying for the transaction with rewards points, establishing an equal payment plan, or paying with the payment instrument. For example, if the authorization system 120, in block 226, saved instructions to include the rewards redemption option in the transaction options, then the rewards redemption option is included in the options on the pop-up window displayed to the user. If the authorization system 120, in block 241, saved instructions to include the equal payment plan option in the transaction options, then the equal payment plan option is included in the options on the pop-up window displayed to the user.

The options provided to the user in the plug-in data may be presented to the user in the pop-up window that opens on the merchant web page. The pop-up window may be initiated by the authorization system 120, the user computing device 110, or the merchant computing device 130. For example, the plug-in software operating on the merchant computing device 130 may direct the pop-up window to open when the plug-in data is received from the authorization system 120. In another example, when the merchant computing device 130 communicates to the authorization system 120 that the user has entered a payment instrument associated with the authorization system 120, the authorization system 120 prepares the plug-in data and communicates the plug-in data and any required plug-in software to the merchant computing device 130 to cause the pop-up window to be displayed. In the example, the plug-in is not integrated into the merchant website software or hardware. Because the plug-in is only initiated at the time of the checkout and is not part of the permanent merchant website software, the method 200 does not require that the authorization system 120 integrate with the merchant computing system.

Figure 5:
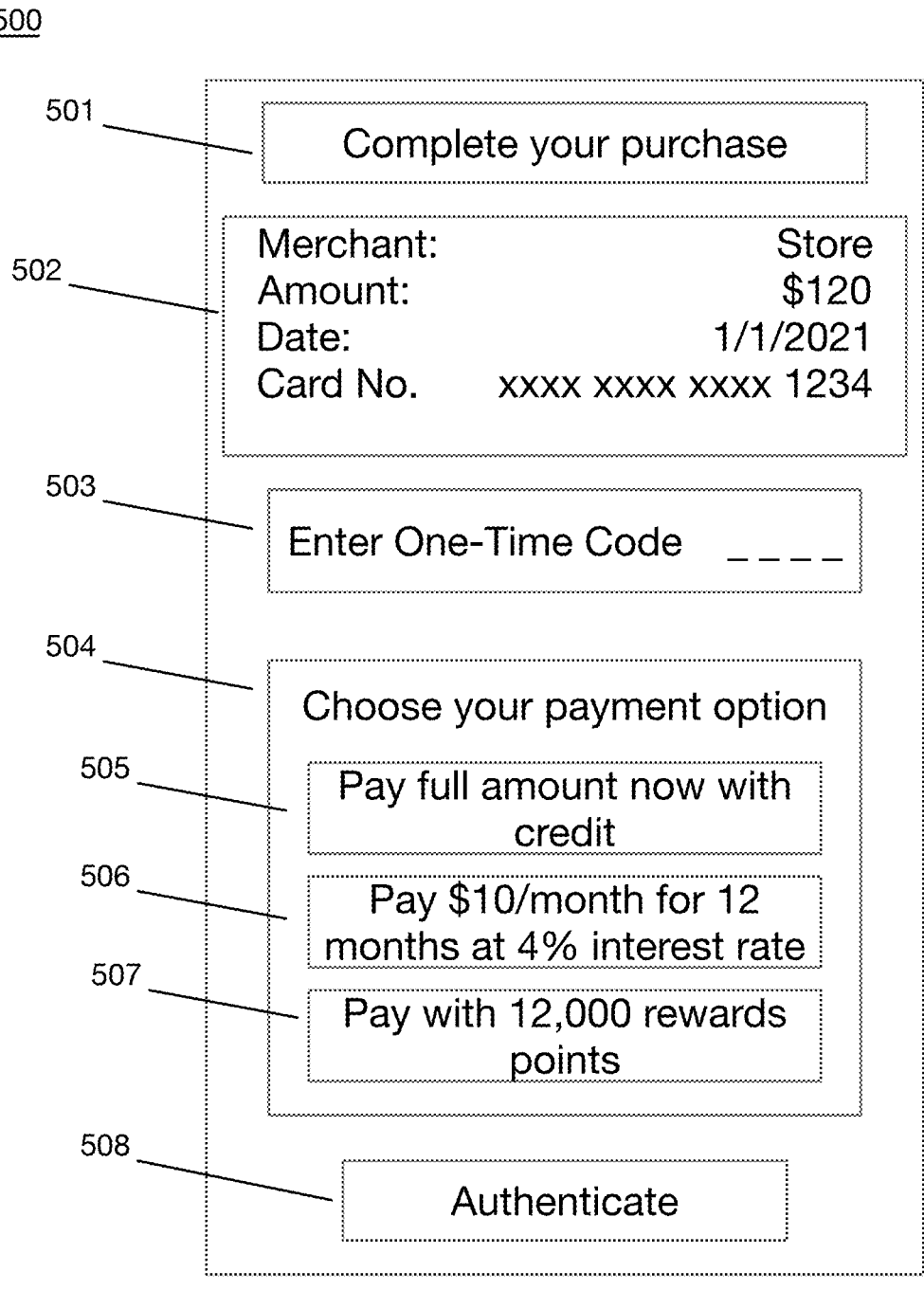
FIG. 5 depicts an illustration of an example pop-up window on a merchant website.

The pop-up window of block 245 is illustrated in greater detail in FIG. 5. FIG. 5 depicts an illustration of an example pop-up window 500 on a merchant website. In the illustration, a pop-up window 500 is directed to be displayed by the plug-in provided by the authorization system 120. The pop-up window 500 is illustrated with a header 501 that instructs the user to complete the purchase by completing the data entry below. The pop-up window 500 is illustrated with a description 502 of the transaction. The description 502 includes any suitable data, such as the merchant identification, the amount of the transaction, the date, and the payment instrument entered or selected.

The pop-up window 500 is illustrated with an entry field 503 for entering the one-time code. The entry field 503 may be for entering any other type of authentication data, such as a password.

The pop-up window 500 is illustrated with a path selection field 504. The path selection field 504 allows a user to select a method for completing the transaction from any available options provided by the authorization system 120. In the illustration, a user is provided with interface objects, such as buttons, for selecting between conducting the transaction with the selected card 505, paying in an equal payment plan 506, and paying with reward points 507. Any other suitable options may be displayed in the path selection field 604.

The pop-up window 500 is illustrated with an interface object to begin the authentication 508. The object 508 may be a button or other object to signify that the user has entered the required data and approved of the transaction. The object 508 will begin a process to communicate the entered data to the authorization system 120 and the merchant computing device 130.

Returning to FIG. 2B, the user selects the option for completing the transaction.

In other examples, the interaction path options displayed on the pop-up window may include options to split the transaction between paths. For example, one of the interface objects may include an option to pay a certain amount with rewards points and pay the rest with the payment instrument. In another example, one of the interface objects may include an option to pay for a portion of the transaction with the payment instrument and pay for the remainder in an equal payments plan.

When a user does not have enough points or does not qualify for an equal payments plan, then the pop-up window may hide or remove the interface objects associated with those interaction paths. For example, if the user does not have enough rewards points to pay for the product completely, then the interface object that offers the pay with rewards points path is not displayed to the user. In another example, if the user does not qualify for any equal payment plans, then the interface object that offers the pay with equal payments plan path is not displayed to the user.

In block 250, the authorization system 120 receives the user entry of the one-time code and the selection of at least one of the transaction options. When the user has entered data into the pop-up window, the user computing device 110, the merchant computing device 130, or any other suitable computing device managing the pop-up window communicates the one-time code and the selection of at least one of the transaction options to the authorization system 120. In another example, the authorization system 120 manages the pop-up window and receives the entries from the user interface.

In block 260, the authorization system 120 verifies an entered one-time code and stores the user-selected transaction option for fulfillment of the transaction. The one-time code may be any type of code, password, or other authentication mechanism entered by the user into the user interface as described in block 230. The authorization system 120 compares the one-time code to the expected one-time code provided by the authorization system 120 to the user computing device 110 in the text, email, push notification, or other communication. In another example, the authorization system 120 compares the code to the expected code stored with the user account, such as an additional password. If the one-time code matches the expected one-time code, then the authorization system 120 determines that the user is authenticated.

The authorization system 120 stores the selected transaction option from the user. For example, if the user selected the option to pay with rewards points and the method 200 followed the path through block 250, then the authorization system 120 stores the selection for later fulfillment of the transaction. If the user selected the option to pay with equal payments and the method 200 followed the path through block 251, then the authorization system 120 stores the selection for later fulfillment of the transaction. The selection may be stored on any account storage 121 or any other suitable server or location of the authorization system 120.

In block 270, the authorization system 120 transmits authorization to the merchant computing device 130. Upon receiving a request from the user to conduct the transaction, the one-time code, the selection of the payment path, and then authorizing the transaction, the authorization system 120 communicates to the merchant computing device 130 that the authorization system 120 has authorized the transaction. The merchant computing device 130 does not need to be notified of the interaction path but simply is notified that the interaction is authorized by the authorization system 120. In alternate examples, the authorization system 120 communicates to the merchant computing device 130 the interaction path that will be used to conduct the transaction.

In block 280, the merchant computing device 130 completes the transaction. In certain examples, the merchant computing device 130 does not have a need to know the payment path selected by the user. The merchant computing device 130 only requires the authorization from the authorization system 120 that the transaction is authorized. The manner in which the transaction is fulfilled by the authorization system 120 is not needed by the merchant computing device 130 to conduct the transaction. For example, if the user selected the rewards points redemption or the equal payments plan, then the authorization system 120 only communicates to the merchant computing device that the transaction will be paid by the authorization system 120. The merchant computing device 130 merely approves the transaction, confers the purchased product to the user, and later seeks fulfillment by the authorization system 120.

In block 290, the authorization system 120 fulfills the transaction with the selected transaction option. The authorization system 120 determines which transaction option the user account was eligible for and which transaction option the user selected. The authorization system 120 begins the fulfillment process by determining, in block 295, if an eligible transaction option was selected by the user.

In block 295, the authorization system 120 makes a decision based on the selected eligible transaction option. If the user selected a rewards redemption option, then the method 200 follows the "Rewards redemption" branch to block 296. In block 296, the authorization system 120 offsets the transaction by redeeming rewards points from the user rewards points account. For example, the authorization system 120 debits the user rewards account and completes the transaction on behalf of the user by settling the transaction with authorization system 120 funds or in any other suitable manner.

Returning to block 295, if the user selected an equal payment plan option, then the method 200 follows the "Equal payments" branch to block 298. In block 298, the authorization system 120 converts the transaction to an equal payment plan. For example, if the user selected the equal payment plan, the authorization system 120 enters the user debt into the equal payments plan program and completes the transaction on behalf of the user by settling the transaction with authorization system 120 funds or in any other suitable manner.

Returning to block 295, if the user selected the payment instrument option, then the method 200 follows the "payment instrument" branch to block 297. In block 297, the authorization system 120 fulfills the transaction with the payment instrument associated with the account. For example, if the user selected the payment instrument purchase, the authorization system 120 debits a user debit account and completes the transaction on behalf of the user by settling the transaction with authorization system 120 funds or in any other suitable manner. In another example, the merchant computing device is provided with an authentication and then communicates with a credit card acquirer system to settle the transaction as with a traditional credit card transaction.

In block 295, the authorization system 120 provides a confirmation message to the user via email or text message, such as SMS. The confirmation message to the user may be an email, text, push notification, or other type of notification with results of the transaction. For example, the confirmation message may include details of the transaction, such as a confirmation of the amount, the merchant, the product purchased, and the date. The confirmation message may include the type of payment plan selected, such as by payment instrument, rewards points, or equal payments. The confirmation message may include details of the plan selected, such as the amount of rewards points used, the number and amount of the equal payments, the interest being charged, or any other suitable information.

Example Systems

FIG. 6 depicts a computing machine 2000 and a module 2050 in accordance with certain examples. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components, for example, a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one or more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and perform calculations and generate commands. The processor 2010 may be configured to monitor and control the operation of the components in the computing machine 2000. The processor 2010 may be a general-purpose processor, a processor core, a multiprocessor, a reconfigurable processor, a microcontroller, a digital signal processor (DSP), an application-specific integrated circuit (ASIC), a graphics processing unit (GPU), a field programmable gate array (FPGA), a programmable logic device (PLD), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain examples, the processor 2010, along with other components of the computing machine 2000, may be a virtualized computing machine executing within one or more other computing machines.

The system memory 2030 may include non-volatile memories, for example, read-only memory (ROM), programmable read-only memory (PROM), erasable programmable read-only memory (EPROM), flash memory, or any other device capable of storing program instructions or data with or without applied power. The system memory 2030 may also include volatile memories, such as random access memory (RAM), static random access memory (SRAM), dynamic random access memory (DRAM), and synchronous dynamic random access memory (SDRAM). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device, such as the storage media 2040.

The storage media 2040 may include a hard disk, a floppy disk, a compact disc read-only memory (CD-ROM), a digital versatile disc (DVD), a Blu-ray disc, a magnetic tape, a flash memory, other non-volatile memory device, a solid state drive (SSD), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules, for example, module 2050, data, or any other information. The storage media 2040 may be part of, or connected to, the computing machine 2000. The storage media 2040 may also be part of one or more other computing machines that are in communication with the computing machine 2000, for example, servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may, therefore, represent examples of machine- or computer-readable media on which instructions or code may be stored for execution by the processor 2010. Machine- or computer-readable media may generally refer to any medium or media used to provide instructions to the processor 2010. Such machine- or computer-readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits, such as microcode or configuration information for an FPGA or other PLD.

The input/output (I/O) interface 2060 may be configured to couple to one or more external devices, to receive data from the one or more external devices, and to send data to the one or more external devices. Such external devices, along with the various internal devices, may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, for example, small computer system interface (SCSI), serial-attached SCSI (SAS), fiber channel, peripheral component interconnect (PCI), PCI express (PCIe), serial bus, parallel bus, advanced technology attached (ATA), serial ATA (SATA), universal serial bus (USB), Thunderbolt, Fire-Wire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touchscreens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or analog communication media, for example, fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to certain examples, any of the processor 2010, the other elements of the computing machine 2000, or the various peripherals discussed herein may be integrated into a single device, for example, a system on chip (SOC), system on package (SOP), or ASIC device.

Examples may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing examples in computer programming, and the examples should not be construed as limited to any one set of computer program instructions. Further, a skilled programmer would be able to write such a computer program to implement an example of the disclosed examples based on the appended flowcharts and associated descriptions in the application text. Therefore, disclosure of a particular set of program code instructions is not considered necessary for an adequate understanding of how to make and use examples. Further, those skilled in the art will appreciate that one or more aspects of examples described herein may be performed by hardware, software, or a combination thereof, as may be embodied in one or more computing systems. Additionally, any reference to an act being performed by a computer should not be construed as being performed by a single computer, as more than one computer may perform the act.

The examples described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the examples presented previously are illustrative, and, in alternative examples, certain acts can be performed in a different order, in parallel with one another, omitted entirely, and/or combined between different example examples, and/or certain additional acts can be performed, without departing from the scope and spirit of various examples. Accordingly, such alternative examples are included in the scope of the following claims, which are to be accorded the broadest interpretation so as to encompass such alternate examples.

Although specific examples have been described above in detail, the description is merely for purposes of illustration. It should be appreciated, therefore, that many aspects described above are not intended as required or essential elements unless explicitly stated otherwise.

Modifications of, and equivalent components or acts corresponding to, the disclosed aspects of the examples, in addition to those described above, can be made by a person of ordinary skill in the art, having the benefit of the present disclosure, without departing from the spirit and scope of examples defined in the following claims, the scope of which is to be accorded the broadest interpretation so as to encompass such modifications and equivalent structures.

What is claimed is:

1. A system for securing interactions using user interface windows generated based on selected interaction paths, comprising:

a storage device; and one or more processors, wherein the one or more processors execute instructions that are stored in the storage device to cause the system to:

receive, from a first computing device at a second computing device over a first communication channel, a request to secure an interaction with a user;

determine, during a time period of the interaction, a plurality of interaction paths available for the user;

generate one or more instructions to display a user interface on a user computing device to receive a security code and the plurality of interaction paths for the user;

transmit, to a plug-in installed on the first computing device during the time period of the interaction and in a second communication channel that is separate from the first communication channel, the one or more instructions for the plug-in to open a pop-up window on the user computing device to receive the security code, wherein the pop-up window overlays a user interface window utilized to conduct the interaction, wherein the pop-up window displays the plurality of interaction paths, and wherein the pop-up window on the user computing device communicates directly with the second computing device, bypassing the first computing device;

communicate the security code to the user computing device in a third communication channel separate from the first communication channel and the second communication channel;

receive a communication from the user computing device in response to opening the pop-up window, wherein the communication comprises a selection of an interaction path and the security code; and cause the interaction to be conducted using a selected interaction path.

2. The system of claim 1, wherein the instructions further cause the one or more processors to communicate a confirmation message to the user computing device that the interaction was conducted with the selected interaction path.

3. The system of claim 1, wherein the instructions for determining the plurality of interaction paths available for the user further cause the one or more processors to:

access an account associated with the user to retrieve a plurality of user parameters; and determine whether the plurality of interaction paths is available to the user based on the plurality of user parameters retrieved from the account associated with the user.

4. The system of claim 1, wherein the instructions for determining the plurality of interaction paths available for the user further cause the one or more processors to:

identify a plurality of applications corresponding to the plurality of interaction paths;

input, into the plurality of applications, a user identifier associated with the user;

receive, from the plurality of applications, a corresponding indication indicating whether a corresponding interaction path is available to the user; and determine that the plurality of interaction paths is available to the user based on each corresponding indication.

5. A method for securing interactions using user interface windows generated based on selected interaction paths, comprising:

receiving, from a first computing device at a second computing device over a first communication channel, a request to secure an interaction with a user;

determining a plurality of interaction paths available for the user;

generating one or more instructions to display (1) a user interface on a user computing device to receive a security code and (2) the plurality of interaction paths for the user;

transmitting, to a plug-in installed on the first computing device in a second communication channel that is separate from the first communication channel, the one or more instructions for the plug-in to open a pop-up window on the user computing device to receive the security code, wherein the pop-up window displays the plurality of interaction paths, and wherein the pop-up window on the user computing device communicates directly with the second computing device, bypassing the first computing device;

communicating the security code to the user computing device in a third communication channel separate from the first communication channel and the second communication channel;

receiving a communication from the user computing device in response to opening the pop-up window, wherein the communication comprises a selection of an interaction path and the security code; and causing the interaction to be conducted using a selected interaction path.

6. The method of claim 5, further comprising communicating a confirmation message to the user computing device that the interaction was conducted with the selected interaction path.

7. The method of claim 5, wherein determining the plurality of interaction paths available for the user further comprises:

accessing an account associated with the user to retrieve a plurality of user parameters; and determining whether the plurality of interaction paths is available to the user based on the plurality of user parameters retrieved from the account associated with the user.

8. The method of claim 5, wherein determining the plurality of interaction paths available for the user further comprises:

identifying a plurality of applications corresponding to the plurality of interaction paths;

inputting, into the plurality of applications, a user identifier associated with the user;

receiving, from the plurality of applications, a corresponding indication indicating whether a corresponding interaction path is available to the user; and determining that the plurality of interaction paths is available to the user based on each corresponding indication.

9. The method of claim 5, wherein the plurality of interaction paths is determined during a time of the interaction.

10. The method of claim 5, wherein the pop-up window overlays a user interface window utilized to conduct the interaction.

11. The method of claim 5, further comprising, in response to the request, transmitting the plug-in to the first computing device with a command to install and activate the plug-in, wherein the plug-in comprises an address associated with the second computing device.

12. The method of claim 5, further comprising transmitting to the plug-in an address associated with the second computing device, wherein the pop-up window communicates directly with the second computing device.

13. One or more non-transitory, computer-readable media storing instructions thereon, wherein the instructions cause one or more processors to perform operations comprising:

receiving, from a first computing device at a second computing device over a first communication channel, a request to secure an interaction with a user;

determining a plurality of interaction paths available for the user;

generating one or more instructions to display (1) a user interface on a user computing device to receive a security code and (2) the plurality of interaction paths for the user;

transmitting, to a plug-in installed on the first computing device in a second communication channel that is separate from the first communication channel, the one or more instructions for the plug-in to open a pop-up window on the user computing device to receive the security code, wherein the pop-up window displays the plurality of interaction paths, and wherein the pop-up window on the user computing device communicates directly with the second computing device, bypassing the first computing device;

communicating the security code to the user computing device in a third communication channel separate from the first communication channel and the second communication channel;

receiving a communication from the user computing device in response to opening the pop-up window, wherein the communication comprises a selection of an interaction path and the security code; and causing the interaction to be conducted using a selected interaction path.

14. The one or more non-transitory, computer-readable media of claim 13, wherein the instructions further cause the one or more processors to communicate a confirmation message to the user computing device that the interaction was conducted with the selected interaction path.

15. The one or more non-transitory, computer-readable media of claim 13, wherein the instructions for determining the plurality of interaction paths available for the user further cause the one or more processors to perform operations comprising:

accessing an account associated with the user to retrieve a plurality of user parameters; and determining whether the plurality of interaction paths is available to the user based on the plurality of user parameters retrieved from the account associated with the user.

16. The one or more non-transitory, computer-readable media of claim 13, wherein the instructions for determining the plurality of interaction paths available for the user further cause the one or more processors to perform operations comprising:

identifying a plurality of applications corresponding to the plurality of interaction paths;

inputting, into the plurality of applications, a user identifier associated with the user;

receiving, from the plurality of applications, a corresponding indication indicating whether a corresponding interaction path is available to the user; and determining that the plurality of interaction paths is available to the user based on each corresponding indication.

17. The one or more non-transitory, computer-readable media of claim 13, wherein the plurality of interaction paths is determined during a time of the interaction.

18. The one or more non-transitory, computer-readable media of claim 13, wherein the pop-up window overlays a user interface window utilized to conduct the interaction.

19. The one or more non-transitory, computer-readable media of claim 13, wherein the instructions further cause the one or more processors to, in response to the request, transmit the plug-in to the first computing device with a command to install and activate the plug-in, wherein the plug-in comprises an address associated with the second computing device.

20. The one or more non-transitory, computer-readable media of claim 13, wherein the instructions further cause the one or more processors to transmit to the plug-in an address associated with the second computing device, wherein the pop-up window communicates directly with the second computing device.

* * * * *